United States Patent [19]

Thorsen et al.

[11] Patent Number: 5,033,713
[45] Date of Patent: Jul. 23, 1991

[54] TEMPERATURE-SENSITIVE ACTUATING APPARATUS FOR A SERVO-APPARATUS

[75] Inventors: Niels P. Thorsen, Sydals; Bjarke Hallenslev, Nordborg, both of Denmark

[73] Assignee: Danfoss A/S, Nordborg, Denmark

[21] Appl. No.: 530,904

[22] Filed: May 29, 1990

[30] Foreign Application Priority Data

Jun. 1, 1989 [DE] Fed. Rep. of Germany ....... 3917884

[51] Int. Cl.$^5$ ............................................. F16K 31/00
[52] U.S. Cl. ..................................... 251/11; 251/177; 251/228; 251/243
[58] Field of Search ................. 251/11, 303, 228, 243, 251/177

[56] References Cited

U.S. PATENT DOCUMENTS

| | | | |
|---|---|---|---|
| 2,074,526 | 3/1937 | Williams | 251/11 |
| 2,731,230 | 1/1956 | Schell | 251/11 |
| 2,787,118 | 4/1957 | Markham | 251/11 |
| 3,366,140 | 1/1968 | Dunn | 251/11 |
| 3,613,732 | 10/1971 | Wilson et al. | 251/11 |
| 3,819,146 | 6/1974 | Dobson | 251/11 |
| 4,000,848 | 1/1977 | Braukmann et al. | 251/11 |
| 4,027,689 | 6/1977 | Wolfe | 251/11 |
| 4,102,496 | 7/1978 | Perl | 251/11 |

Primary Examiner—A. Michael Chambers
Attorney, Agent, or Firm—Wayne B. Easton; Clayton R. Johnson

[57] ABSTRACT

The temperature sensitive apparatus controls fluid flow from one line to others and includes an elongated wire of a shaped memory wire that changes in length with changes in temperature extended into a valve housing for pivotally moving valve mechanism in the valve housing against the action of a spring from a fluid flow blocking position to a position permitting fluid flow upon heating the wire. The wire is connected to the valve mechanism and extends through a tube, both of which extend exterior of the valve housing with the major portion of the length of the wire being exterior thereof. The tube extends into a connecting member housing that is attached to the exterior of the valve housing and contains mechanism surrounding the tube to heat the wire. The tube is substantially thermally insulated from the interior of the valve housing. The heating mechanism may include a generator for an electric alternating field to induce a heating current in the wire, or an A.C. voltage coil to have a magnetic field which is linked to a closed electric circuit in which the wire is disposed.

14 Claims, 3 Drawing Sheets

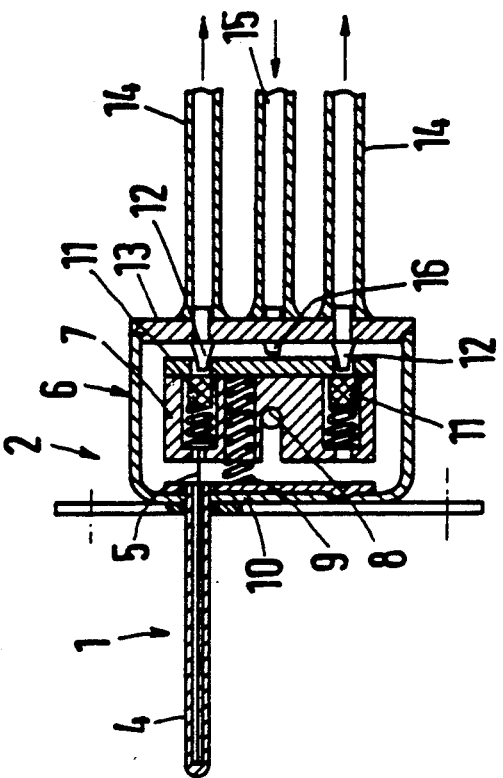
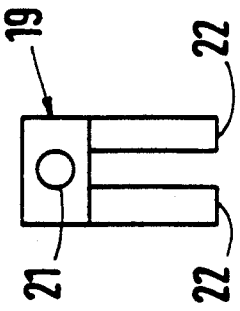
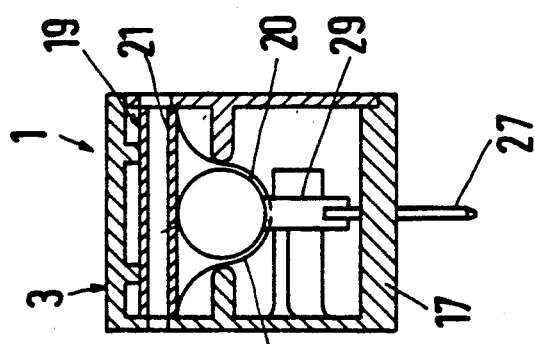
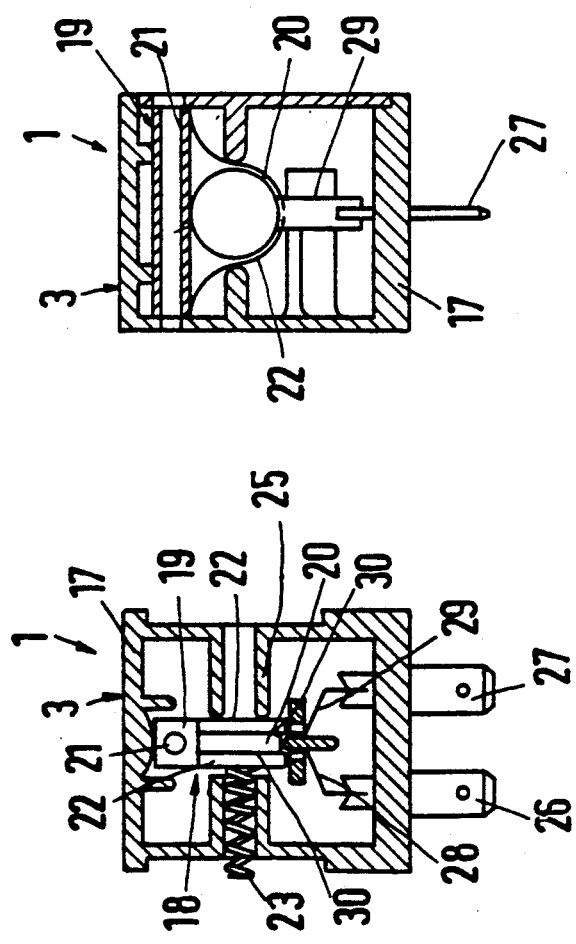
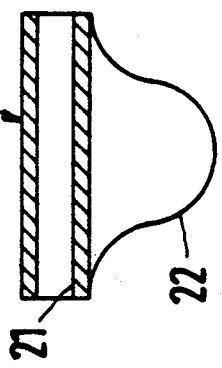

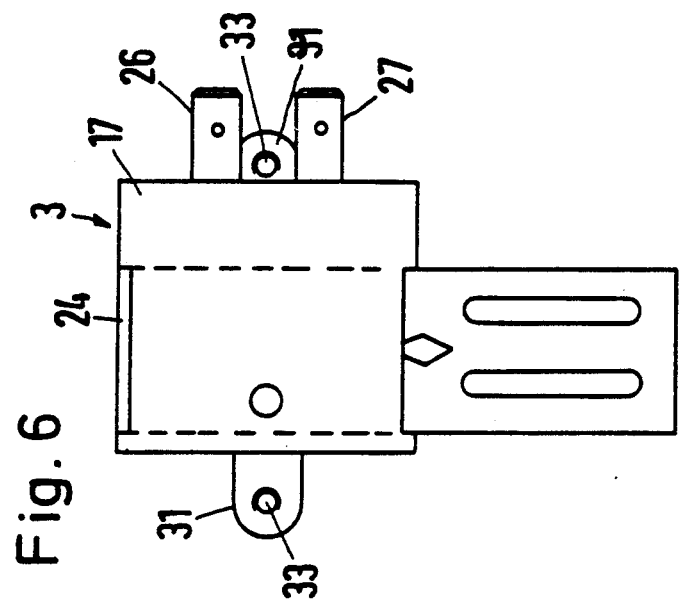
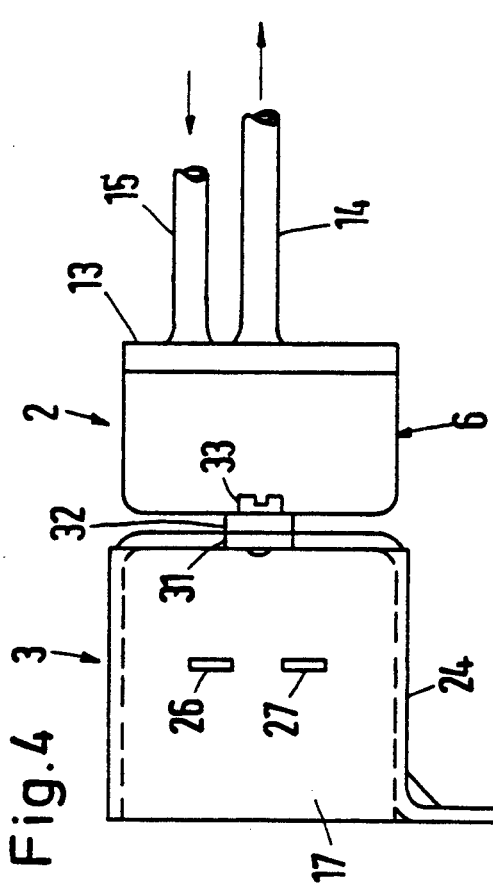
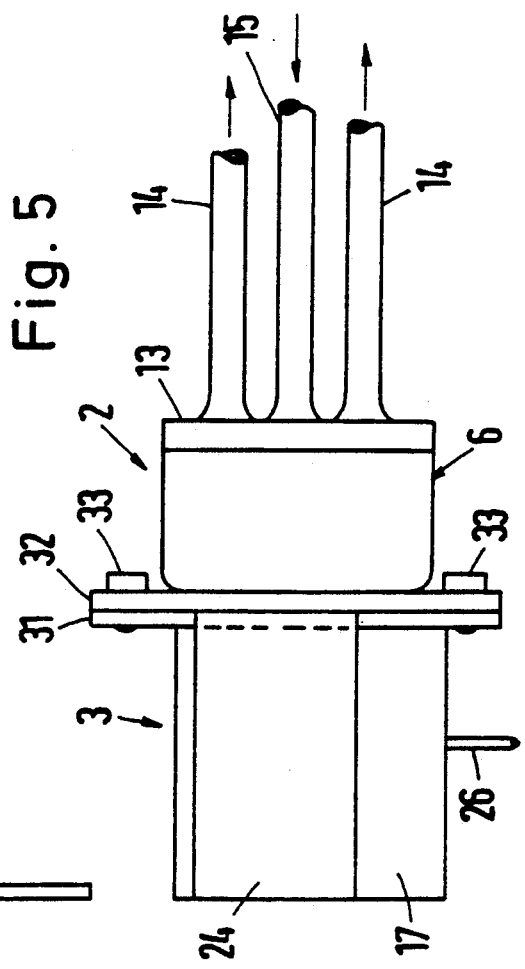

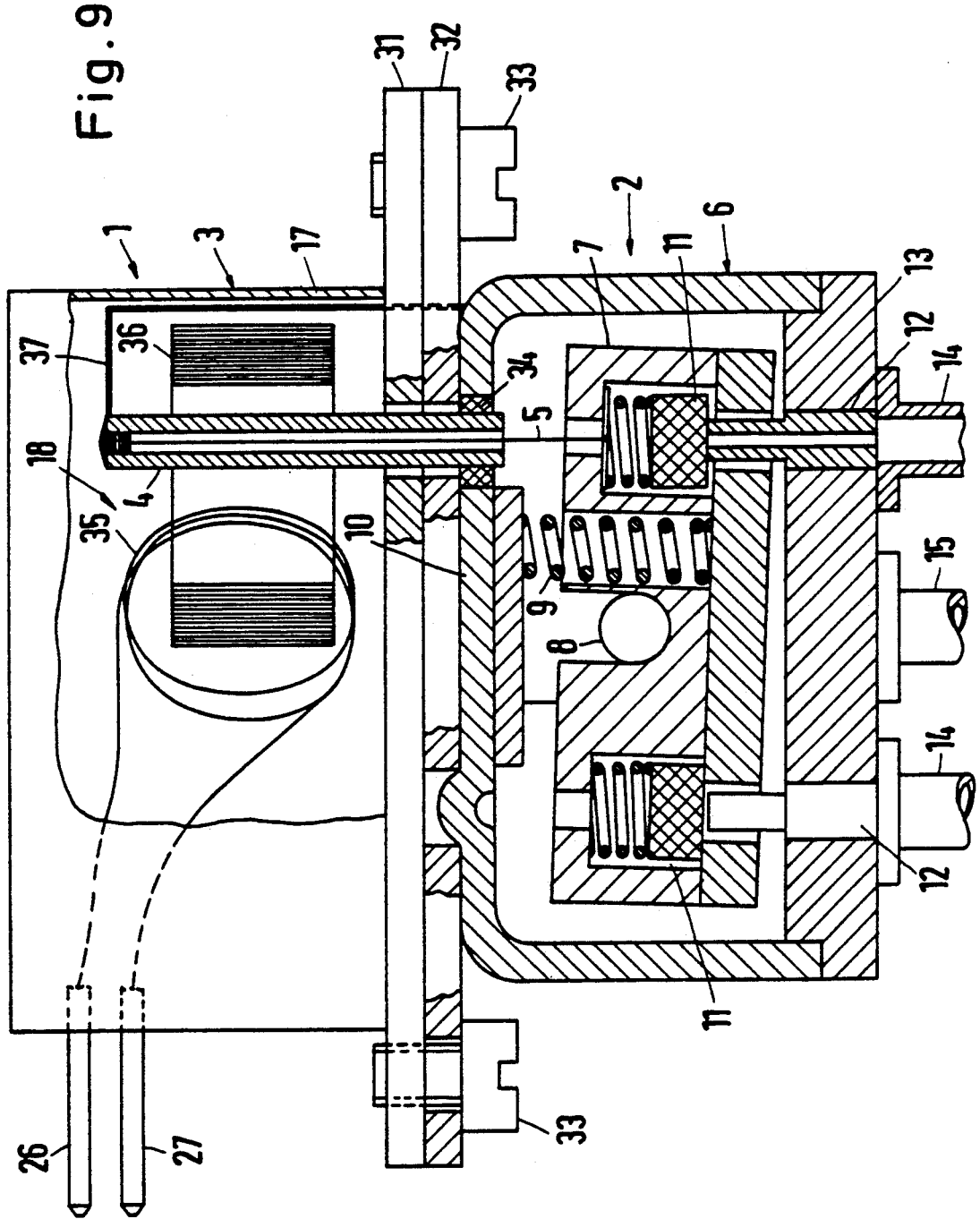

TEMPERATURE-SENSITIVE ACTUATING APPARATUS FOR A SERVO-APPARATUS

The invention relates to a temperature-sensitive actuating apparatus for a servo-apparatus, particularly for a switching apparatus, particularly for a switching valve, comprising an actuating element which has a length changing with temperature, is of a metal having a shape memory and is for a servo-element in a housing of the servo-apparatus, and comprising a heating apparatus.

It is known to actuate the switching tappet of a micro-switch or the closure member of an analog valve by means of a wire of a nickel/titanium alloy which has a shape memory and contracts on heating. Heating of the wire is effected by passing an electric current through it. The advantage of such an alloy with a shape memory is a very rapid change in shape depending on the temperature. If the micro-switch is actuated by the wire, the latter must be electrically insulated from the surrounding housing so that it can be connected to a current source for the purpose of heating the wire. It might be difficult to heat the wire indirectly in some other manner should this be desired, unless one undertakes an expensive reconstruction of the arrangement consisting of the wire and the micro-switch. In the case of actuating the valve closure element of the known analog valve, the wire is disposed within the valve housing, one of its ends is connected by way of its metallic valve closure member and the likewise metallic housing of the valve to one pole of the source of heating current and its other end is connected by way of an insulated housing throughway to the other pole of the source of heating current, the liquid that is controlled by the analog valve simultaneously flowing about the wire over substantially its entire length. The disadvantage of this construction is that the liquid can influence the temperature of the wire, and vice versa. If the liquid is, for example, a refrigerant, the wire is cooled. On the other hand, the refrigerant can vaporise.

It is an object of the invention to provide a temperature-sensitive actuating apparatus according to the classifying portion of claim 1, which permits greater latitude in the construction and arrangement as well as the nature of heating, irrespective of the servo-apparatus employed.

According to the invention, this problem is solved in that the actuating apparatus comprises a connecting member attachable to the exterior of the housing of the servo-apparatus and containing the heating apparatus and that, when the connecting member is attached, the larger part of the actuating element is introduced into the connecting member out of the servo-apparatus through a wall of the housing of the servo-apparatus substantially thermally insulated from the interior of the housing of the servo-apparatus.

With this construction it is possible to shape the connecting member and the heating apparatus contained therein substantially at will. If the switching apparatus is a valve, one ensures that a fluid flowing through the valve will not come into substantial contact with the temperature-sensitive actuating element.

Preferably, the actuating element is a wire which is disposed lengthwise of a tube passing through a wall of the housing of the servo-apparatus, one end of the wire being connected to the outer end of the tube and the other end to the servo element. A wire can be very thin relatively to its length so that it will have only a low thermal storage capacity and its temperature can be changed very rapidly, whether indirectly or directly by passing a heating current through the wire. The tube simultaneously serves as a holder and as protective means for the wire.

If the tube is in the form of a capillary tube, it is substantially filled out by the wire to facilitate rapid heating of the wire from the exterior through the tube. At the same time, in the case of actuating a valve closure element by means of the wire, one prevents the fluid that is controlled by the valve from penetrating into the tube.

The heating apparatus may surround the tube so that the actuating element contained therein can be very rapidly heated from all sides.

In particular, the heating apparatus may comprise a heating element which is in thermally conductive contact with the tube.

The heating element may be disposed in a metallic holder which surrounds the tube directly. In this way, the heat of the heating element is very rapidly transmitted to the tube and from there to the actuating element.

Further, the holder may comprise a bore for receiving the part of the tube projecting out of the housing of the servo apparatus. When attaching the connecting member, it is then merely necessary to introduce the tube into the bore to establish the thermal connection between the heating apparatus and the actuating element.

It is also possible for the heating apparatus to comprise a generator for an electric alternating field which induces a heating current in the actuating element. This permits heating of the actuating element by the electric current of a heating current source, without making it necessary to produce a galvanic connection between the actuating element and the heating current source.

The heating apparatus may comprise a coil which can be connected to the A.C. voltage and the magnetic field of which is linked to a closed electric circuit in which the actuating element is disposed. In this way, the coil and the electric circuit form a transformer in which the electric circuit forms a single short-circuited secondary winding in which, however, by reason of the high stepping down ratio between the primary and secondary sides, only a comparatively low voltage is induced and, accordingly, no excessively high short ciruit current will flow with a comparatively high ohmic dimensioning of the actuating element.

If the coil comprises a closed magnetic core surrounding the tube, stray field losses are substantially avoided.

Provision may be made for the tube to be of metal and passed through the metallic housing of the servo-apparatus electrically insulated therefrom and for the servo-element to be electrically connected to the housing and the outer end of the wire being connected to the housing by a conductor. With this construction, the tube can be additionally heated by an induced eddy current and contribute to the heating of the wire.

Preferred examples of the invention will now be described in more detail with reference to the drawing, wherein:

FIG. 1 is a part-sectional elevation of a connecting member of an actuating apparatus according to the invention, FIG. 2 is a different elevation of the FIG. 1 connecting member taken partly in a cross-section perpendicular to the FIG. 1 cross-sectional plane, FIG. 3 illustrates a servo-apparatus in the form of a change-over valve with a further part of the actuating apparatus according to the invention in the form of a tube and, contained therein, an actuating wire which is of an alloy having a shape memory and is led out of the servo-apparatus, FIGS. 4 to 6 illustrate different elevations of the actuating apparatus according to the invention and of the FIGS. 1 to 3 servo-apparatus actuated thereby in the assembled condition, FIG. 7 is a cross-section through a holder in the actuating apparatus for receiving a tube portion led out of the servo-apparatus, FIG. 8 is a side elevation of the FIG. 7 holder, and FIG. 9 is a part-sectional elevation of a further example of an actuating apparatus according to the invention with a servo-apparatus connected thereto.

In the example of FIGS. 1 to 8, an actuating apparatus 1 for a servo-apparatus 2 in the form of a change-over valve contains a connecting member 3 and a metal tube 4 with an actuating element in the tube 4 in the form of a wire 5 of a metal having a shape memory, in this case a nickel/titanium alloy, which ensures that the wire 5 will very rapidly contract upon heating and resume its original shape after cooling.

The servo-apparatus 2 has a housing 6 in which a servo-element 7 in the form of a valve closure member is pivotally mounted about a fixed pivot pin 8 against the force of a return spring 9. The tube 4 is a capillary tube of metal and most of its length is passed out of the housing 6 through a wall 10 of the housing 6, it being fixed in the wall 10. The outer end of the tube 4 is closed and the inner end is open. One end of the wire 5 is secured to the outer end of the tube 4 and the other end of the wire 5 is fixed directly to the servo-element 7. In bores, the servo-element 7 contains spring loaded closure members 11 of rubber or other suitable material which each cooperate with a valve seat 12 in the form of a nozzle passed through a closure plate 13 of the housing 6 and connected to connecting tubes 14. A further connecting tube 15 is in permanent communication with the interior of the housing 6 by way of a connecting nipple 16. In the illustrated position of the servo-element 7, both nozzles 12 are open so that liquid introduced through the connecting tube 15 can flow off through the two other connecting tubes 14. Normally, however, one or the other nozzle 12 is closed by the associated valve closure member 11 depending on the length of the wire 5 and the other nozzle 12 is open. The liquid may be a refrigerant which, depending on the position of the tiltable servo-element 7, is supplied to one or the other two connecting tubes 14.

To heat the wire 5, the connecting member 3 contains a heating apparatus 18 in a housing 17, the heating apparatus comprising a metallic holder 19 and an electric heating element 20 in the form of a PTC resistor. The holder 19 is separately illustrated in FIGS. 7 and 8. It contains a bore 21 in which the tube 4 fits and two limbs 22 between which the heating element 20 can be arranged in thermal contact with the holder 19. The holder 19 is pressed against an inner housing projection 25 by a spring 23 which is passed through the housing 17 and the outer end of which is supported against a mounting frame 24 which surrounds the housing 17, is omitted from FIG. 1 for ease of illustration but is shown in FIGS. 4 to 6. In this way, the spring is locked in the housing 17. The supply of heating current to the heating element 20 is by way of contacts 26, 27 and conductor strips 28, 29, an electrically insulating foil 30 being arranged between the respective conductor strips 28, 29 and the limbs 22.

To attach the connecting member 3 to the servo-apparatus 2, a connecting bar 31 is secured to the connecting member 3 or mounting frame 24 and a further connecting bar 32 is secured to the housing 6 of the servo-apparatus 2, the connecting bars being interconnected by screws 33.

In the example of FIG. 9, the servo-apparatus 2 is the same in principle as that of the FIGS. 1 to 8 example but the tube 4 is passed through an electrically and thermally insulating ring 34 inserted in the throughway of the housing 6. The connecting member 3 of the actuating apparatus 1, on the other hand, contains a heating apparatus 18 in the form of a generator for an electric alternating field which induces a heating current in the wire 5. For this purpose, the generator contains a coil 35 with an annular closed laminated magnetic coil 36, the coil 35 being connectable to an A.C. voltage of 220 V by way of contacts 26 and 27. The magnetic coil 36 surrounds the tube 4 which is of metal and the outer end of the wire 5 is electrically connected by way of a conductor 37 to the metallic housing 6 of the servo-apparatus 2. Since the housing 6 is connected to the inner end of the wire 5 by way of the return spring 9, the pivot pin 8 and the metallic housing of the servo-element 7, the wire 5 is disposed in a closed electric circuit which practically forms the secondary winding of the transformer in which a comparatively low voltage of about 1 V is induced to drive a current through this secondary circuit. The cross-section and length of the wire are dimensioned so that the wire has a resistance of 2 to 3 ohm and is correspondingly heated by the current flowing through the secondary circuit. It thereby contracts so that the servo element 7 tilts against the force of the return spring 9 and the throughflow through the switching valve is changed over from the left hand connecting tube 14 of FIG. 9 to the right hand connecting tube 14. Eddy currents may be induced in the tube 4 by the alternating field of the transformer 18 and these likewise heat the tube 4 and thus indirectly additionally the wire 5. When the alternating voltage is switched off, the current through the wire 5 is interrupted so that the wire cools and expands again and the servo-element 7 tilts back to the illustrated position under the influence of the return spring 9.

The tube 4 may be made of an electrically and thermally insulating material. The insulating ring 34 could be dispensed with.

In general, any other heating apparatus may be conveniently arranged in the connecting member 3 so that the wire 5 can be easily and rapidly heated because the connecting member 3 can be of any desired shape independently of the servo-apparatus 2.

Instead of the wire which contracts on heating one may also provide a rod which expands on heating and is made of an alloy having a shape memory, in which case the return spring 9 is either in the form of a tension spring or is disposed on the other side of the pivot pin 8.

Instead of the change-over valve, one can also employ a simple switching valve or an analog valve or an electric switching apparatus, e.g. a change-over apparatus as the servo-apparatus 2.

We claim:

1. Switching apparatus for controlling the flow of fluid from a first line to a second line, comprising actuatable servo valve means that is operable between a closed condition and an open condition for controlling the flow of fluid from the first line to the second line, the valve means including a valve housing having an interior for having the first and second lines opening thereinto and movable means within the valve housing operable between the valve means conditions, and actuating means for operating the servo valve means between its conditions in response to changes in temperature, the actuating means including a connecting member having a connecting member housing removably attachable to the valve housing to extend exterior of the valve housing, the connecting member housing having an interior, an elongated actuating element that is made of a shaped memory material to change in length with temperature changes, and having a major length portion contained in the connecting member housing interior and a minor length portion extending within the valve housing interior when the connecting member housing is attached to the valve housing, and heating means having at least a major portion thereof in the container housing for heating the actuating element, the valve housing having wall means extending between the housing interiors through which the actuating element extends for substantially thermally insulating the interior of one housing from the interior of the other housing.

2. The apparatus of claim 1 wherein the movable means includes valve mechanism pivotally mounted in the housing for movement between a closed position blocking fluid flow between the lines and an open position permitting fluid flow between the lines, and resilient means for urging the valve mechanism to the valve mechanism closed position, the actuating element being connected to the valve mechanism and of a length for contracting upon heating to pivot the valve mechanism to the valve mechanism closed position.

3. The apparatus of claim 1 wherein the heating means includes a tube having the actuating element extending therein and a heating element in thermal contact with the tube.

4. The apparatus of claim 3 wherein the heating element includes a metal holder directly surrounding the tube and the actuating element comprises a nickel titanium alloy wire.

5. The apparatus of claim 1 wherein the movable means includes a servo element movable between movable between a closed position and an open condition for controlling the flow of fluid from the first line to the second line, the heating means includes an elongated tube extended though the wall means and having a first end remote from the valve hosing and a second end adjacent to the wall to open to the valve housing interior, and the actuating means includes an elongated wire extending within the tube and having one end attached to the tube first end and an opposite end connected to the servo element.

6. The apparatus of claim 5 wherein the tube is a capillary tube.

7. The apparatus of claim 6 wherein the heating means includes means in surrounding relationship to the tube for heating the tube.

8. The apparatus of claim 7 wherein the tube is made of metal, the means surrounding the tube includes a closed magnetic core surrounding the tube and a magnetic coil that in conjunction with the core generate an electric alternating field to induce a heating current in the wire.

9. The apparatus of claim 1 wherein the heating means includes a generator for generating an electric alternating field to induce a heating current in the actuating element.

10. The apparatus of claim 9, wherein and the heating means includes an elongated tube into which the actuating elements extends and includes a first end adjacent to the wall means and an opposite end, the generator includes an alternating current coil surrounding the tube to induce eddy currents in the tube, the movable means includes a metal valve mechanism for controlling fluid flow between the lines, and the actuating means includes means that in combination with the valve mechanism forms a closed electric circuit in which the actuating element is disposed.

11. The apparatus of claim 10 wherein the coil comprises a closed magnetic core surrounding the tube.

12. The apparatus of claim 11 wherein the tube is made of metal and opens into the valve housing in an electrically insulate relationship, the actuating element is an elongated wire having a first end connected to the servo valve means and an opposite end remote from the valve housing, and the means in combination with the valve housing includes conductor means for electrically connecting the tube opposite end to the valve housing.

13. Switching apparatus for controlling the flow of fluid from a first line to a second line, comprising actuatable servo valve means that is operable between a closed condition and an open condition for controlling the flow of fluid from the first line to the second line, the valve means including a valve housing having an interior for having the first and second lines opening thereinto and movable means within the valve housing operable between the valve means conditions, and actuating means for operating the servo valve means between its conditions in response to changes in temperature, the actuating means including a connecting member having a connecting member housing removably attachable to the valve housing to extend exterior of the valve housing, an elongated actuating element that is made of a shaped memory material to change in length with temperature changes, and having a major length portion contained in the connecting member housing and a minor length portion extending within the valve housing, the actuating element having one end connected to the movable means and an opposite end mounted in the connection housing, and heating means in the container housing for heating the actuating element to change the length of the actating element and thereby move the movable means from one of the valve means conditions to the other, the valve housing having a wall through which the actuating element extends and located between the housing interiors to substantially thermally insulate the interior of one housing interior from the other.

14. The apparatus of claim 13 wherein the movable means includes a servo element pivotably movable between a closed position and an open condition for controlling the flow of fluid from the first line to the second line, the heating means includes an elongated tube extended though the wall and having a first end remote from the valve hosing and a second end adjacent to the wall and opening to the valve housing interior, means for closing the tube first end, and the actuating means includes an elongated wire having one end attached to the closing means and an opposite end connected to the servo element.

* * * * *